(12) United States Patent
Ilak et al.

(10) Patent No.: US 12,716,392 B2
(45) Date of Patent: Aug. 25, 2026

(54) SUPERVISORY CONTROL FOR INTEGRATED POWER AND THERMAL MANAGEMENT OF PROPULSION SYSTEMS

(71) Applicant: Raytheon Technologies Corporation, Farmington, CT (US)

(72) Inventors: Milos Ilak, Hoboken, NJ (US); Edmund Emmett Rochford, West Hartford, CT (US); Martin Amari, Glastonbury, CT (US); Abhijit Chakraborty, West Hartford, CT (US); Jerry Ding, Brookfield, WI (US); Daniel T. Pollock, West Hartford, CT (US); Konda Reddy Chevva, Ellington, CT (US); Jeffrey Ernst, Wethersfield, CT (US); William S. Heglund, Rockford, IL (US)

(73) Assignee: RTX Corporation, Farmington, CT (US)

( * ) Notice: Subject to any disclaimer, the term of this patent is extended or adjusted under 35 U.S.C. 154(b) by 647 days.

(21) Appl. No.: 18/085,680

(22) Filed: Dec. 21, 2022

(65) Prior Publication Data

US 2024/0209798 A1 Jun. 27, 2024

(51) Int. Cl.
*F02C 9/28* (2006.01)
*B64D 31/00* (2024.01)
(Continued)

(52) U.S. Cl.
CPC ................ *F02C 9/28* (2013.01); *B64D 31/00* (2013.01); *B64D 31/06* (2013.01); *F02C 9/263* (2013.01);
(Continued)

(58) Field of Classification Search
CPC ........ G05B 13/02; G05B 23/02; G05B 15/02; G05B 17/02; G05B 13/04; B64D 41/00;
(Continued)

(56) References Cited

U.S. PATENT DOCUMENTS 5,806,052 A 9/1998 Bonissone et al.
6,415,595 B1 * 7/2002 Wilmot, Jr. ............. F02C 7/224 60/785
(Continued)

OTHER PUBLICATIONS

Coordinated Model Predictive Control of Aircraft Gas Turbine Engine and Power System, by Seok et al.; published in the Journal of Guidance, Control, and Dynamics; vol. 40, No. 10, Oct. 2017 (18 pages). (Year: 2017).*
(Continued)

*Primary Examiner* — Ronald D Hartman, Jr.
(74) *Attorney, Agent, or Firm* — Bachman & LaPointe, P.C.

(57) ABSTRACT

A system including a supervisory controller configured to receive one or more mission objectives for an aircraft mission, and condition data; a memory for storing program instructions; at least one local supervisory controller, operatively coupled to the memory, and in communication with the supervisory controller and operative to execute program instructions to: simulate execution of the aircraft mission to address at least one of the one or more mission objectives; receive data output from at least one subsystem, the data output including a measurement of an aircraft physical system; generate a mission plan executable to address at least one of the one or more mission objectives via manipulation of the at least one subsystem; receive the generated mission plan at a subsystem controller directly from the at least one local supervisory controller; and automatically execute the generated mission plan to operate an aircraft.

17 Claims, 9 Drawing Sheets

(51) Int. Cl.

| | |
|---|---|
| ***B64D 31/06*** | (2024.01) |
| ***B64D 37/00*** | (2006.01) |
| ***F02C 9/26*** | (2006.01) |
| ***G05B 13/00*** | (2006.01) |
| ***G05B 13/04*** | (2006.01) |

(52) U.S. Cl.
CPC ............. *G05B 13/00* (2013.01); *G05B 13/04* (2013.01); *B64D 37/00* (2013.01)

(58) Field of Classification Search
CPC ........ B64D 45/00; B64D 31/00; B64D 31/06; B64D 37/00; F02C 9/28; F02C 9/20; F02C 9/26
USPC ...................................................... 700/28, 33
See application file for complete search history.

(56) References Cited

U.S. PATENT DOCUMENTS 6,823,253 B2 11/2004 Brunell
9,354,621 B2 * 5/2016 Westervelt ........... G05B 13/026
9,828,870 B2 * 11/2017 Ho .......................... F01D 19/00
11,003,146 B2 * 5/2021 Westervelt ............ H04L 9/0643
11,214,380 B2 * 1/2022 de Bock ............ G05D 23/1917
11,371,431 B1 * 6/2022 Dyson, Jr. ................. F02K 5/00
12,145,737 B2 * 11/2024 Martin ..................... G05B 9/03
2007/0118271 A1 * 5/2007 Wiseman ........... G05B 23/0283 477/30
2009/0319059 A1 * 12/2009 Renfro .................. G05B 17/02 700/30
2011/0178648 A1 * 7/2011 Calvignac .............. F01D 15/10 700/291
2015/0362923 A1 12/2015 Westervelt et al.
2017/0050740 A9 * 2/2017 Snyder .................. B64D 41/00

OTHER PUBLICATIONS

Extended European Search Report for EP Application No. 23217053.0 dated May 23, 2024, 13 pp.

Stursberg et al., "Decentralized Optimal Control of Distributed Interdependent Automata With Priority Structure", IEEE Transactions On Automation Science And Engineering, IEEE Service Center, New York, NY, vol. 14, No. 2, Apr. 1, 2017, pp. 785-796.

Qi et al., "Distributed Supervisory Predictive Control of Distributed Wind and Solar Energy Systems", IEEE Transactions On Control Systems Technology, IEEE Service Center, New York, NY, vol. 21, No. 2, Mar. 1, 2013, pp. 504-512.

Liu et al., "Distributed Energy and Thermal Management of a 48-V Diesel Mild Hybrid Electric Vehicle With Electrically Heated Catalyst", IEEE Transactions on Control Systems Technology, vol. 28, No. 5, Sep. 1, 2020, pp. 1878-1891.

* cited by examiner

SUPERVISORY CONTROL FOR INTEGRATED POWER AND THERMAL MANAGEMENT OF PROPULSION SYSTEMS

BACKGROUND

The present disclosure is directed to the improved control system implemented as a supervisory controller, which provides references for existing inner loop controls.

Next generation military aircraft will require improved integration and coordination of the engine with air cycle and electrical systems for power and thermal management in order to fulfill more complex missions with higher demands and loads.

What is needed is a control system for a combined engine, fuel thermal management system (FTMS), an air cycle machine for cooling aircraft loads and providing cockpit air, and a generator.

SUMMARY

In accordance with the present disclosure, there is provided a system comprising a supervisory controller configured to: receive one or more system objectives and constraints for mission segments or a complete aircraft mission received from an operator or a mission management computer receive data output from at least one subsystem, the data output including a measurement of an aircraft physical system state; generate reference commands to coordinate local subsystem controllers to address one or more system objectives and constraints; send computed reference commands to local subsystem controllers; a memory for storing program instructions; a processor for solving constrained optimization problems in response to changing data outputs from subsystems or changing system objectives and constraints; at least one local supervisory controller, operatively coupled to the memory, and in communication with the supervisory controller and operative to execute program instructions to: receive reference commands from a supervisory controller; and execute reference commands received from the supervisory controller to operate the at least one subsystem.

A further embodiment of any of the foregoing embodiments may additionally and/or alternatively include the at least one subsystem comprises an element of an integrated propulsion, power, and thermal management system for the aircraft.

A further embodiment of any of the foregoing embodiments may additionally and/or alternatively include the system further comprising instructions for the local supervisory controller to: generate coordinated control commands for at least one subsystem controller based on the data outputs from subsystems while enforcing constraints by solving constrained optimization problems on a real-time computer; and send the generated commands to the subsystem controllers so that system objectives can be met and constraints are enforced throughout the system operation.

A further embodiment of any of the foregoing embodiments may additionally and/or alternatively include the system further comprising instructions for the subsystem controllers to send commands to actuators within the subsystems, the actuators selected from the group consisting of valve actuators, fuel injector actuators, vane actuators, and the like.

A further embodiment of any of the foregoing embodiments may additionally and/or alternatively include the commands are sent from a Model Predictive Control algorithm executed on a real-time computer.

A further embodiment of any of the foregoing embodiments may additionally and/or alternatively include at least one measurement from the at least one subsystem is replaced with estimates computed by an estimation algorithm on a real-time computer.

A further embodiment of any of the foregoing embodiments may additionally and/or alternatively include the system further comprising a distributed architecture for the supervisory controller, the distributed architecture comprising a set of local supervisory controllers that solve subproblems for at least two subsystems, each of the local supervisory controllers being in operative communication to simultaneously achieve the mission or system objective while enforcing system constraints.

A further embodiment of any of the foregoing embodiments may additionally and/or alternatively include the system further comprising generation of a linear model of the system using a composition of subsystem linear models that can either be computed in real-time or looked up in a database based on measured or estimated subsystem states.

In accordance with the present disclosure, there is provided a system for aircraft having subsystems configured to support aircraft missions comprising a local supervisory controller having real-time processing capability configured to process inputs from subsystems, compute reference command outputs with an optimization solver; and send reference command outputs to the subsystems based on defined mission goals and constraints.

A further embodiment of any of the foregoing embodiments may additionally and/or alternatively include communication is implemented via a physical network comprising at least two local supervisory controllers attached locally to corresponding subsystems and configured to solve subproblems and communicate partial solutions in a synchronized fashion among at least one additional local supervisory controller, and the at least one local supervisory controller configured to send commands to the subsystems.

In accordance with the present disclosure, there is provided a process for an aircraft comprising providing a supervisory controller receiving one or more system objectives and constraints for mission segments of a complete aircraft mission received from an operator or a mission statement computer; receiving data output from at least one subsystem, the data output including a measurement of an aircraft physical system state; generating reference commands to coordinate local subsystem controllers to address one or more system objectives and constraints; sending computed reference commands to local subsystem controllers; providing a memory for storing program instructions; providing a processor for solving constrained optimization problems in response to changing data outputs from subsystems or changing system objectives and constraints; providing at least one local supervisory controller, operatively coupled to the memory, and in communication with the supervisory controller; receiving reference commands from a supervisory controller; and executing the reference commands received from the supervisory controller to operate the at least one subsystem.

A further embodiment of any of the foregoing embodiments may additionally and/or alternatively include the at least one subsystem comprises an element of an integrated propulsion, power, and thermal management system for the aircraft.

A further embodiment of any of the foregoing embodiments may additionally and/or alternatively include the process further comprising generating coordinated control commands for the at least one subsystem controller based on the data outputs from subsystems while enforcing constraints by solving constrained optimization problems on a real-time computer; and sending the generated commands to the subsystem controllers so that system objectives are obtained and constraints are enforced throughout the system operation.

A further embodiment of any of the foregoing embodiments may additionally and/or alternatively include the process further comprising sending commands to actuators within the subsystems, the actuators selected from the group consisting of valve actuators, fuel injector actuators, vane actuators, and the like.

A further embodiment of any of the foregoing embodiments may additionally and/or alternatively include the commands are sent from a Model Predictive Control algorithm executed on a real-time computer.

A further embodiment of any of the foregoing embodiments may additionally and/or alternatively include at least one measurement from the at least one subsystem is replaced with estimates computed by an estimation algorithm on a real-time computer.

A further embodiment of any of the foregoing embodiments may additionally and/or alternatively include the process further comprising: implementing a distributed architecture for the supervisory controller, the distributed architecture comprising a set of local supervisory controllers that solve sub-problems for the at least one subsystem, each of the local supervisory controllers being in operative communication to simultaneously achieve the mission or system objective while enforcing system constraints.

A further embodiment of any of the foregoing embodiments may additionally and/or alternatively include the process further comprising generating a linear model of the system using a composition of subsystem linear models that can either be computed in real-time or looked up in a database based on measured or estimated subsystem states.

A further embodiment of any of the foregoing embodiments may additionally and/or alternatively include the process further comprising providing a safe control input to the subsystem in case of a failure of the supervisory controller or an error in the transmission of reference command from the supervisory controller to the subsystem controller.

Other details of the control system are set forth in the following detailed description and the accompanying drawings wherein like reference numerals depict like elements.

DETAILED DESCRIPTION

Figure 1:
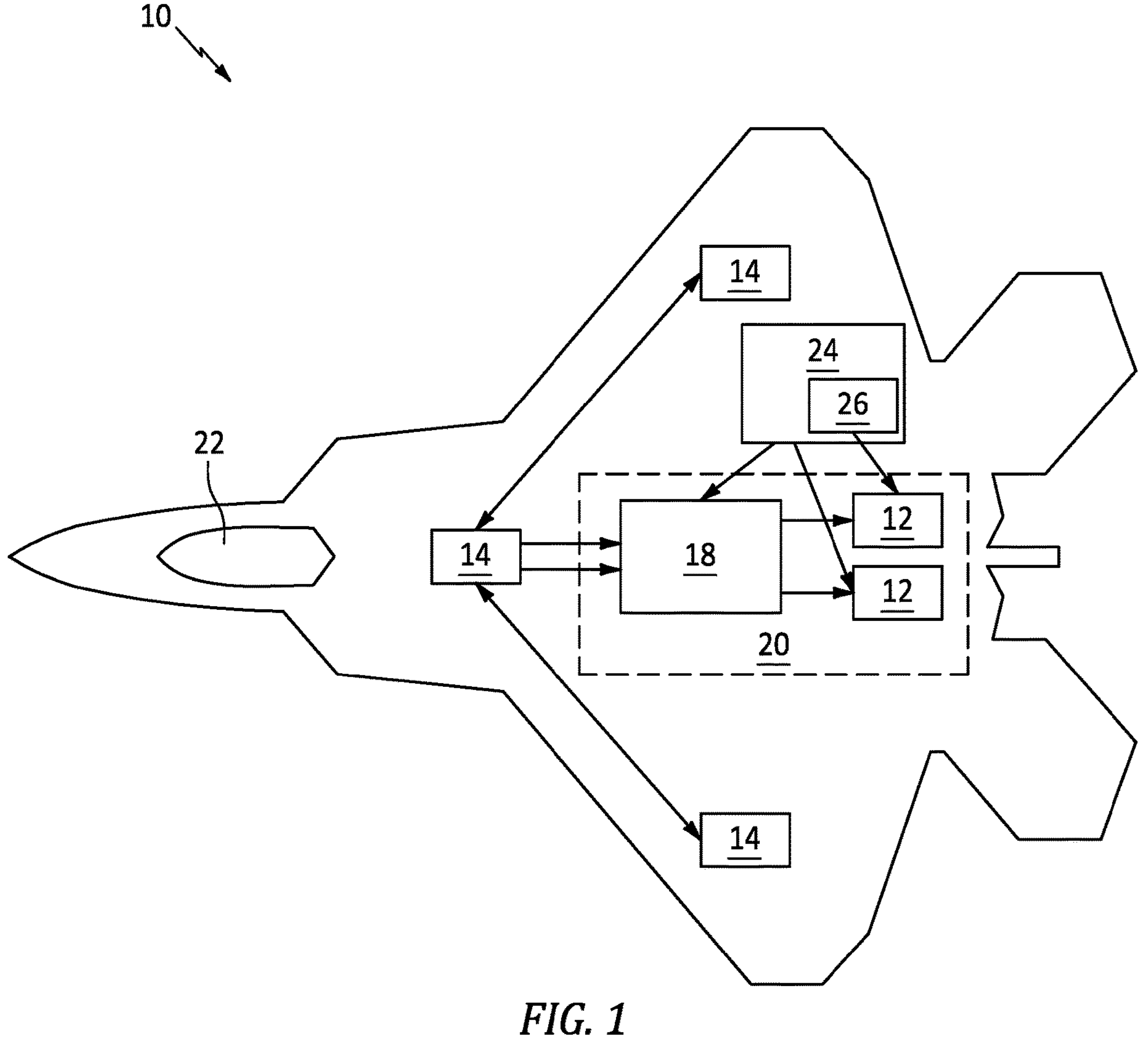
FIG. 1 is a schematic representation of an exemplary aircraft.

Referring now to FIG. 1, there is illustrated an exemplary aircraft 10. The aircraft 10 may include one or more engines 12, and one or more fuel tanks 14 for storing aircraft fuel. The engine 12 may be a turbo fan, turbo shaft engine, turbo prop engine, turbo jet, adaptive or variable cycle gas turbine engine, or any other suitable engine. Although two engines are shown, it should be appreciated that one engine, or more than two engines may be provided to the aircraft 10. The aircraft 10 may include a system 16 (FIG. 2), including one or more power and thermal management systems (PTMS) 18. In one or more embodiments, the PTMS may be an Integrated Propulsion Power Thermal Management System (IPPTMS) 20. As used herein, the IPPTMS 20 may include and be powered by one or more engines 12.

In one or more embodiments, the IPPTMS 20 may serve as the environmental control system (ECS) to provide cooling for liquid and air-cooled aircraft components and equipment, as well as thermal control and pressurization for a cockpit 22. In one or more embodiments, the system 16 can include a system coordinating control system 24 that may include a mission advisor module or a mission execution module 26. The system coordinating control system 24 may control operation of the PTMS 18 and the engines 12.

Figure 2:
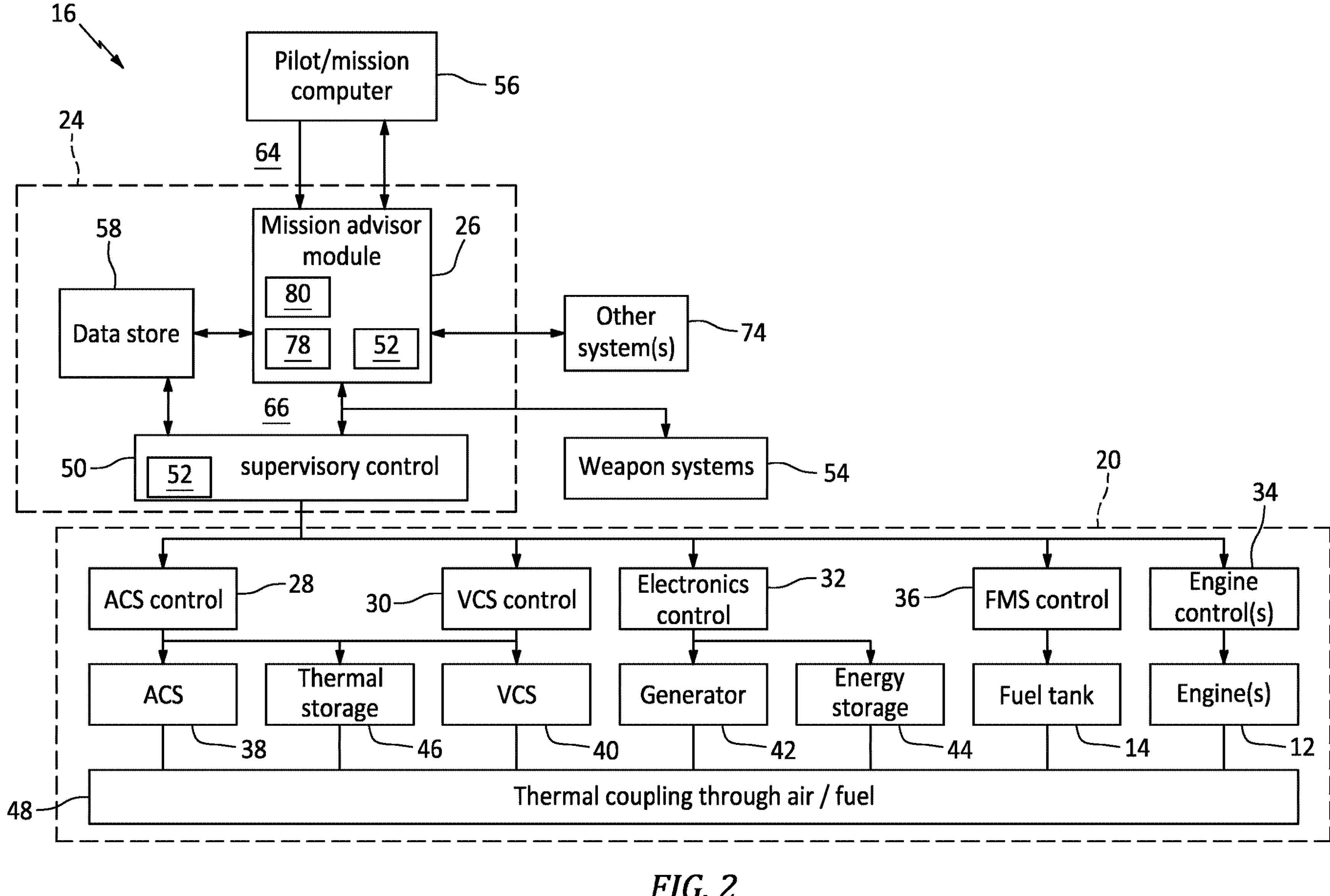
FIG. 2 is a schematic representation of an exemplary supervisory control integrated with an aircraft.

Referring also to FIG. 2, the IPPTMS 20 may include one or more connected sub-systems, and control the operation of those sub-systems. The sub-systems may include an Air Cycle System (ACS) control 28, a Vapor Cycle System (VCS) control 30, a high-power Electronics Control 32, a next generation air vehicle Engine control 34, and a Fuel Management System (FMS) control 36.

In one or more embodiments, the ACS control 28 may operate an ACS 38. The ACS 38 may include an air cycle machine, engine streams, one or more condensers, one or more heat exchangers and air valves. The VCS control 30 may operate a VCS 40. The VCS 40 may include condensers, one or more evaporators, refrigerant valves and refrigerant pumps. The Electronics control 32 may operate a generator 42 and energy storage 44. The energy storage 44 may be a battery, capacitor, or other suitable electrical storage. The ACS control 28 and the VC control 30 may operate a thermal storage 46. The thermal storage 46 may include coolant and a heat exchanger (e.g., evaporator) to remove heat. The Engine control 34 may operate the engine 12. The FMS control 36 may operate the fuel tanks 14, fuel pumps, and fuel valves.

The IPPTMS 20 may provide the ability to address adaptively various aircraft system heat loads (e.g., thermal coupling through air/fuel 48) by manipulating the control of the one or more of its sub-systems/components via an IPPTMS Supervisory control 50. The IPPTMS Supervisory control 50 may represent software and hardware circuitry that includes and/or is connected to one or more processors 52 (e.g., microprocessors, integrated circuits, field programmable gate arrays, etc.) that perform operations to control the sub-components. Ideally, all waste heat may be transferred to the fuel as it is supplied to the engines 12, since the fuel is the aircraft's most efficient heat sink. However, increased heat loads combined with decreased fuel burn may result in less fuel thermal capacity. As a result, heat may be removed to the ambient air or engine bypass flow and may cause drag and reduce the benefit of electrification. The IPPTMS 20 may move heat into the fuel whenever possible, but then directs the heat to the ambient air when necessary. Embodiments including the mission advisor module 26 provide for the IPPTMS 20 to calculate different versions to move the heat into the fuel, and each version's impact on a mission objective. Embodiments including the mission execution module 26 provide for the IPPTMS 20 to move the heat in such a way that best meets the mission objective.

In one or more embodiments, the system 16 may include weapon systems 54. The weapon systems 54 may consume significant electrical energy, and thereby develop significant waste-heat that the IPPTMS system 20 may then have to accommodate, otherwise the weapon systems 54 may overheat, resulting in reduced capability or permanent damage. The system 16 may also include the mission advisor module 26, in one or more embodiments. The mission advisor module 26 may be in communication with a pilot/mission computer 56, the IPPTMS 20 and the weapons system 54.

In one or more embodiments, devices, including those associated with the system 16 and any other devices described herein, may exchange information via any communication network which may be one or more of a Local Area Network ("LAN"), a Metropolitan Area Network ("MAN"), a Wide Area Network ("WAN"), an ARINC 429, MIL-STD-1553, IEEE-1394, a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. One example of such a protocol is the User Datagram Protocol (UDP). Note that any devices described herein may communicate via one or more such communication networks.

In one or more embodiments, the mission advisor module 26 may be located internal to the IPPTMS 20 or external to the IPPTMS 20. As shown in FIG. 2, the mission advisor module 26 is external to the IPPTMS 20 and located in the system coordinating control 24. In one or more embodiments, the mission advisor module 26 may receive information from at least one of the IPPTMS 20, via the IPPTMS Supervisory Control 50 and weapons system 54 by at least one of querying the IPPTMS 20 and the weapons system 54, respectively, and continually receiving updates from the IPPTMS 20 and the weapons system 54. The mission advisor module 26 may include one or more processing elements, or processor 52. The processor 52 may, for example, be a conventional microprocessor, and may operate to control the overall functioning of the mission advisor module 26.

In one or more embodiments, the mission advisor module 26 may receive requirements and relevant mission information. Leveraging detailed knowledge of the IPPTMS 20, the mission advisor module 26 may generate various mission plans to be received by the pilot and/or mission computer for selection thereby. The selected plan is received and executed by the IPPTMS 20 via manipulation of the sub-systems to control one or more operations of the aircraft 10. In some embodiments, signals received by the IPPTMS 20, aircraft 10 and other systems may cause modification in the state or condition or another attribute of one or more physical elements of the aircraft 10.

In one or more embodiments, the system 16 may include a computer data store 58 that may provide information to the mission advisor module and/or the mission execution module 26 and may store results from the mission advisor module and mission execution module 26. Data may be supplied from at least one of the PTMS 18/IPPTMS 20 and the data store 58 to the mission advisor module or the mission execution module 26. In embodiments, the data store 58 may be part of the mission advisor module/mission execution module 26, or the pilot/mission computer 56.

In one or more embodiments, the data store 58 may comprise any combination of one or more of a hard disk drive, RAM (random access memory), ROM (read only memory), flash memory, etc. The data store 58 may store software that programs the processor 52 and the mission advisor module/mission execution module 26 to perform functionality as described herein.

Figure 3:
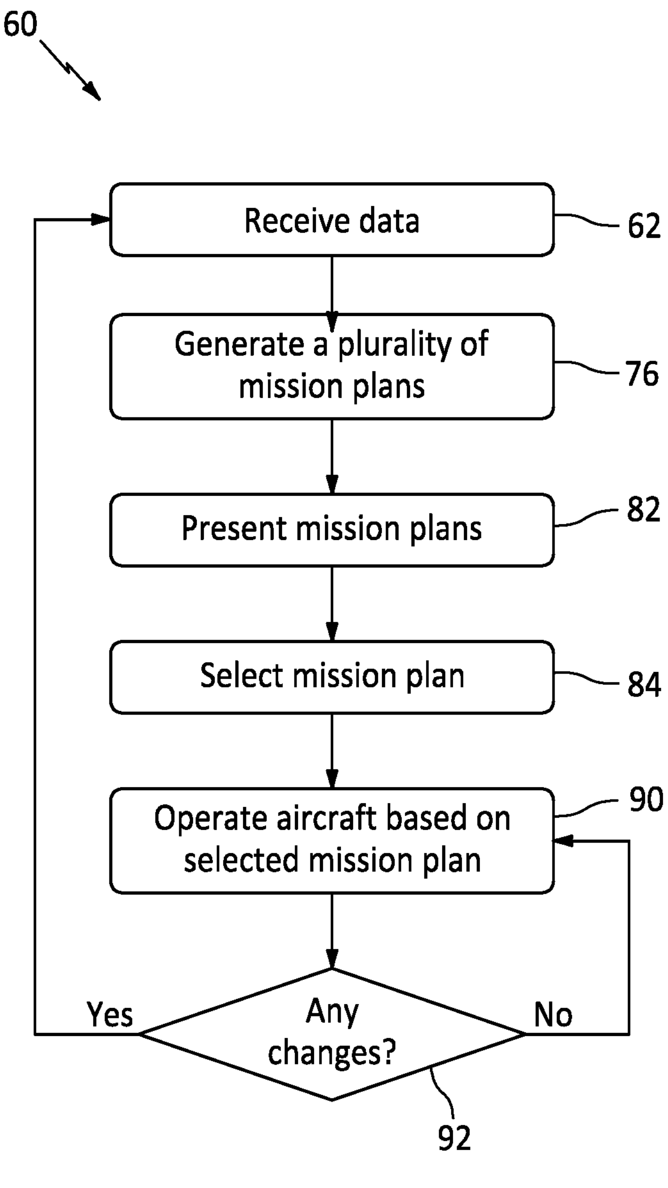
FIG. 3 is a schematic representation of an exemplary process map for a supervisory control.
Figure 4:
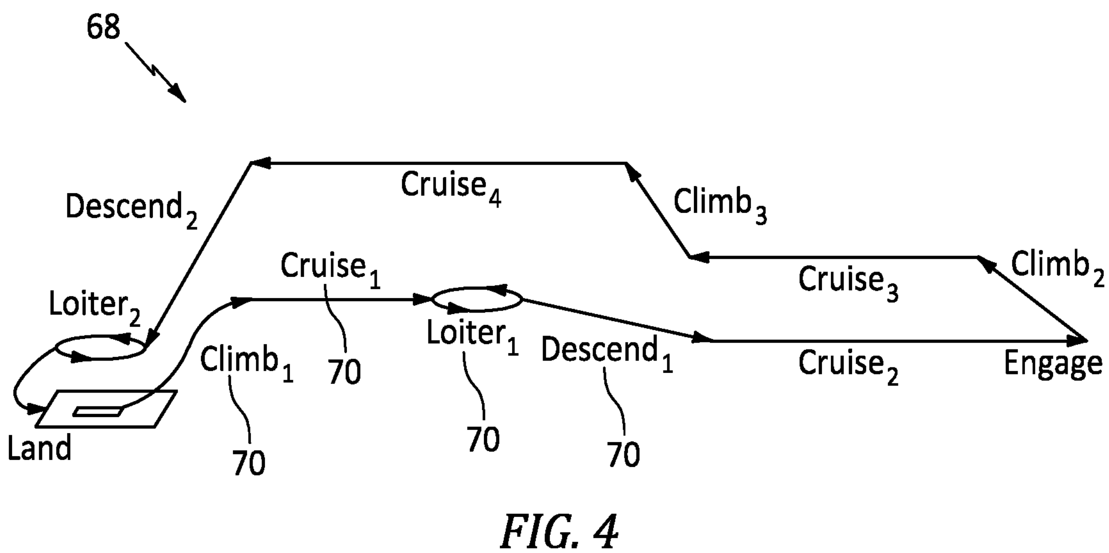
FIG. 4 is a schematic representation of an exemplary aircraft mission.
Figure 5:
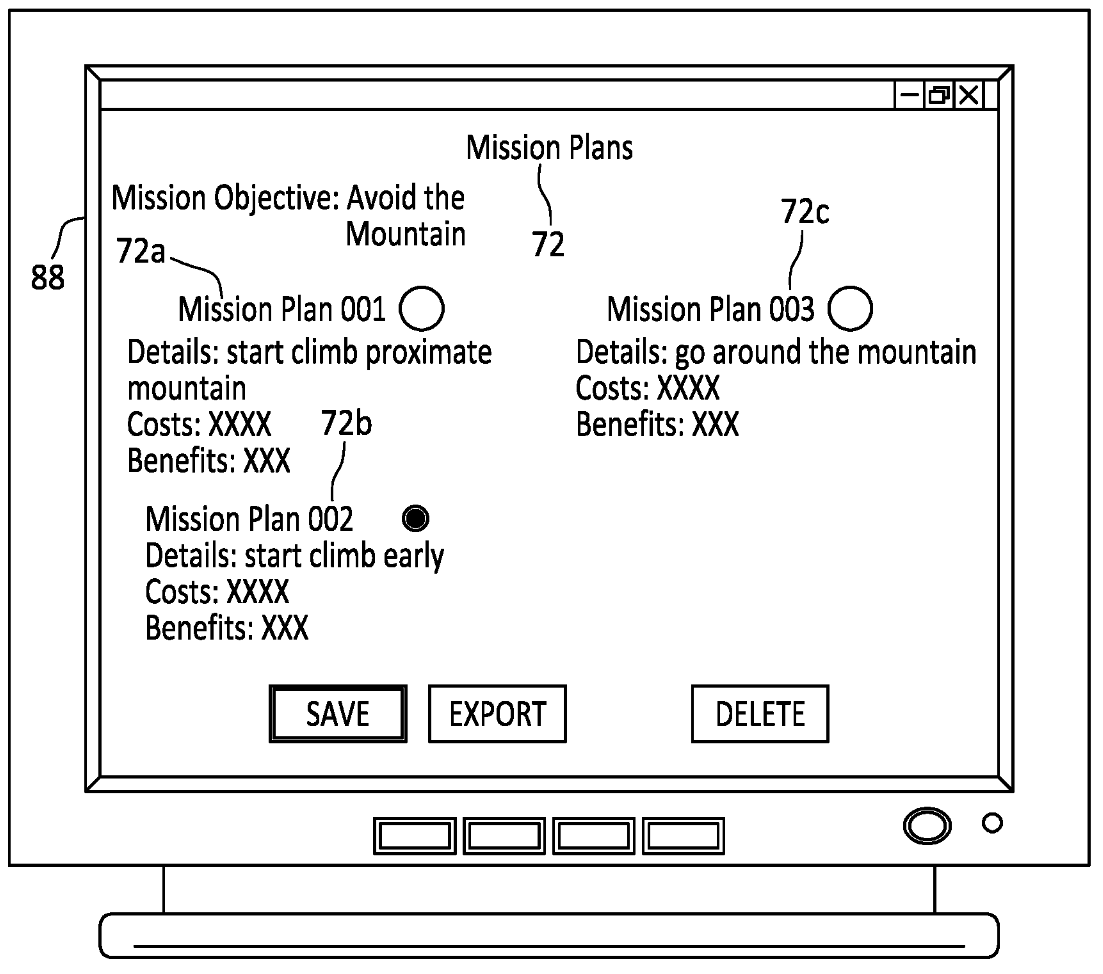
FIG. 5 is a schematic representation of an exemplary monitor.

Turning to FIGS. 3 to 5, a flow diagram of an example of operation, an example of a flight mission and an example of a mission plan according to some embodiments is provided. In particular, FIG. 3 provides a flow diagram of a process 60, according to some embodiments. Process 60, and any other process described herein may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 16 is conditioned to perform the process 60 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

Initially at 62, data is received. In one or more embodiments, the mission advisor module 26 may receive one or more mission objectives 64 for an aircraft mission, condition data 66 associated with the aircraft 10 and the aircraft mission data 68. In one or more embodiments, the mission objectives 64 and aircraft mission data 68 may be received from a pilot and/or system administrator, or any other suitable source via the mission computer 56. In one or more embodiments, the mission objectives 64 may include reduction of fuel consumption, increase flight range, and thermal heat sink availability for use of a high-power system.

The aircraft mission data 68 may include distance, altitude, engagement plans, and aircraft speed targets. For example, the aircraft mission data 68 shown in FIG. 4, includes a plurality of segments 70 (e.g., $Climb_1$, $Cruise_1$, $Loiter_1$, $Descend_1$, $Cruise_2$, Engage, $Climb_2$, $Cruise_3$, $Climb_3$, $Cruise_4$, $Descend_2$, $Loiter_2$, and Land.) Each segment 70 may be associated with its own objective, and resulting mission plan, as described below. For example, the mission advisor module 26 may generate a mission plan 72 to use the most thermal efficiency between $Climb_1$ and $Cruise_2$, and then when the aircraft gets to $Cruise_2$, the system may prepare for additional thermal capacity/prepare thermal storage to get ready for engagement. As another example, the mission advisor module 26 may generate the mission plan 72 to tailor the $Cruise_1$ and $Cruise_2$ segments 70 of the flight plan to tailor the flight system such that a thermal reservoir may be chilled to establish a thermal capacity or storage by cooling to a low set point, optimizing for a planned future Engage segment 70, which may require significant electrical systems to reject heat to the charged thermal reservoir. As used herein, the terms "flight plan," and "aircraft mission" may be used interchangeably.

The condition data 66 may be received from at least one of the IPPTMS 20, via the IPPTMS Supervisory Control 50, one or more other sources 74, and estimated by the system 16. In one or more embodiments, the condition data 66 may include at least one of weather data, engine state data (e.g., speeds, temperatures, fuel flows, pressures), aircraft state data (e.g., fuel temperature and quantity, aircraft weight, altitude, Mach number, ambient temperature), and power-thermal management state data (e.g., heat-sink temperatures, fuel-coolant-flow rates and temperatures, thermal energy storage state and temperature). Other suitable condition data 66 may be received (e.g., sensor damage state, and/or component damage or failure state, etc.).

The condition data 66 may include a threat list. The threat list may include data regarding a defined threat area, data to define what constitutes a hostile force, data to determine when hostile forces are in a pre-set range, and data to support the pilot when the pilot needs to react to a threat. For example, if a pilot is entering a hostile environment, it may be desirable to have a larger energy capacity to act in the hostile environment, if needed, as opposed to operating in a more efficient mode. As another example, when an aircraft 10 is leaving a defined threat area, the system 16 may know where the aircraft is, in relation to the defined threat area, and may act appropriately (e.g., decrease energy reserves).

However, the defined threat area may change, and this changed threat area may be received as an input to the mission advisor module 26, and the mission advisor module 26 may then generate an updated mission plan 72, as described further below. For example, one or more other sub-systems 74 of the system 16 may detect at least one hostile force near the aircraft 10. This detection may be an input to the mission advisor module 26. In one or more embodiments the mission advisor module 26 may receive input from one or more sub-systems 74 on the aircraft 10 itself, in addition to the IPPTMS 20. The mission objectives 64 and the condition data 66 may be weighted for different segments 70 of the flight plan.

Turning back to the process 60, in step 76, a first plurality of mission plans 72 to execute the mission are generated. Each mission plan of the plurality of mission plans may address at least one of the one or more mission objectives via manipulation of the IPPTMS 20. In one or more embodiments, the objective may be to optimize at least one of the one or more mission objectives 64 via manipulation of the IPPTMS 20. In one or more embodiments, the objective may be to balance one or more objectives, without optimizing any particular parameter. In one or more embodiments, the mission plan may include inputs to the subsystems of the IPPTMS 20. These inputs may include bleed flow commands, electrical system load commands, cooling load commands, valve position command and other system setpoints and configurations. In one or more embodiments, the mission plan may estimate unmeasurable system states, such as certain flows, and may estimate system, subsystem and/or component degradation. In one or more embodiments, the mission plan 72 may be generated for each mission segment 70 of the mission. As used herein, the term "mission plan" may refer to a mission plan for a single segment or may refer collectively to the mission plans for two or more segments.

After receipt of the mission objectives 64 and the condition data 66, the mission advisor module 26 may generate the plurality of mission plans 72 based on one or more rule sets and threshold values. The rule sets may include one or more contingency rules or prioritization, whereby if a particular condition exists, a particular mission plan is generated over another mission plan. The rule sets and threshold values may be received in the system 16 prior to process 60. The mission advisor module 26 may include a model 78 representative of the operation of each of the sub-systems. The model 78 encodes the performance of the sub-system. The mission advisor module 26 may include an optimizer 80. The mission advisor module 26 may execute the model 78 and optimizer 80 for one or more different scenarios/simulations. For example, the model for an engine sub-system 12 may include, for a given condition, with a given geometry of the engine, the costs to produce thrust. The mission advisor module 26 may use this engine performance information to generate an optimized thrust production via the optimizer 80. The output from the mission advisor module 26 may be at least one mission plan 72. The output from the mission advisor module 26 may be a default mission plan that may not include any suggestions (e.g., in a failure scenario).

Each mission plan 72 may include the steps to execute the mission, and the costs associated with that execution. The mission plan 72 may indicate which objective is being optimized. For example, if the mission plan is related to the aircraft 10 flying over a mountain, one mission plan **72*a* may be to do a vertical climb when the aircraft reaches the mountain, and the cost of this mission is more fuel burn, but a lower cruising altitude for longer time; another plan 72*b* may provide the option of starting the climb early, instead of a vertical climb when the aircraft reaches the mountain, and the cost of this mission plan is slower, potentially more efficient climb, more time at higher altitude; another mission plan 72*c*** may be to go around the mountain, and the cost of this mission plan is longer distance, but lower overall altitude.

The mission plan 72 may present the options that may be used to optimize certain objectives. The input to the mission advisor module 26 may indicate when, in the future, the aircraft 10 will need different amounts of thermal energy, and then the mission plan 72 may include multiple options for the engine controller 34 to control the engine 12 to produce that power when needed in the most efficient way. Engines may be adaptable, and for a given thrust, there may be several ways to make the thrust with an internal variable configuration. Per at least one mission plan 72, the engine 12 may make power in the most efficient way possible, making the thermal management more effective. For example, if the aircraft 10 has to fly 500 miles and then engage in a mission at the end of the 500 miles, the aircraft 10 may need some thermal capability at 500 miles. The system 16 does not need to make the most thermal power the whole 500 miles (e.g., $Climb_1$, $Cruise_1$, $Loiter_1$, $Descend_1$), but when nearing the 500-mile mark, the system 16 may produce extra thermal power (e.g., when nearing $Cruise_2$) or may intelligently use maximum power when not generating maximum heat to build up a reserve (e.g., energy storage) to accommodate the maximum heat later. It should be noted that there may be multiple ways to run the engine when the engine is a variable-cycle engine, for example, and there may be different benefits based on the operation mode. Additionally, the system 16 may be able to dissipate extra thermal power in the event there's an engagement with forces along the way to the 500-mile mark based on at least one contingency rule. The engine 12 may include variable features and multiple generators that enable the generation of electrical power and thrust in a plurality of ways. These features may be optimized to meet thrust and power generation demands, while respecting operability limitations, in the most fuel-efficient manner. It should be noted that a benefit of embodiments is that by planning when different quantities of thermal power may be used, and taking contingencies into consideration, the engine may experience less wear and tear.

Turning back to the process 60, in step 82 the generated plurality of mission plans 72 are presented to at least one of the pilot and the mission computer 56. Then in step 84, a mission plan 72 is selected from the plurality of generated mission plans by at least one of the pilot and the mission computer 56. In one or more embodiments, the generated first plurality of mission plans may be presented via a user interface 88, or any other suitable presentation. In one or more embodiments, the user interface 88 may receive the output (plurality of mission plans) that is to be presented to the user/mission computer 56, and may also communicate input data (e.g., selection of a mission plan 72) received from the user or mission computer 56 to the system 16. The user interface 88 may represent a display device, a touch-screen, laptop, tablet computer, mobile phone, speaker, haptic device, heads up display, helmet mounted display, cockpit display, or other device that communicates or conveys information to a user or operator. In accordance with any of the embodiments described herein, a user may access the system 16 via user interface 88 to view information about and/or manage the aircraft 10. Then in step 90, the aircraft 10 may be operated based on the selected mission plan 72.

The system 16 may constantly be monitoring data in real-time that may change the mission plan (e.g., at least one of the objectives 64 and condition data 66 may be updated and/or changed) during operation of the aircraft 10.

In step 92, it is determined whether there are any changes to at least one of the objectives 64 and the condition data 66. If it is determined in step 92 that there are no changes, the process 60 returns to step 90, and operation of the aircraft continues per the selected mission plan 72.

Real-time execution of a control system means producing correct commands to actuators so that they move in time to avoid violating the control system requirements or constraints. Real-time optimization means solving an optimization problem to produce one or more control system commands in time to avoid violating the control system requirements or constraints.

If it is determined in step 92 that there is at least one change, the process 60 proceeds to step 62 and the at least one changed objective 64 and condition data 66 are received as input to the mission advisor module 26. In one or more embodiments, during operation of the aircraft 10, new/updated information from the sub-systems may be received by the IPPTMS 20, and then the mission advisor module 26. The mission advisor module 26 may present new options as new data becomes available. For example, weather condition data 66 may be updated to now indicate a rain storm is up ahead, and the mission advisor module 26 may then present an option to fly around the storm. As another example, threat list data may be updated when a hostile threat is detected, and the hostile threat was not present previously; then the mission advisor module 26 may provide at least one or more mission plans related to survivability. It should be noted that while a large number of possible scenarios exist with respect to operation of the aircraft, embodiments provide an optimum for a given segment and a given objective.

Figure 6:
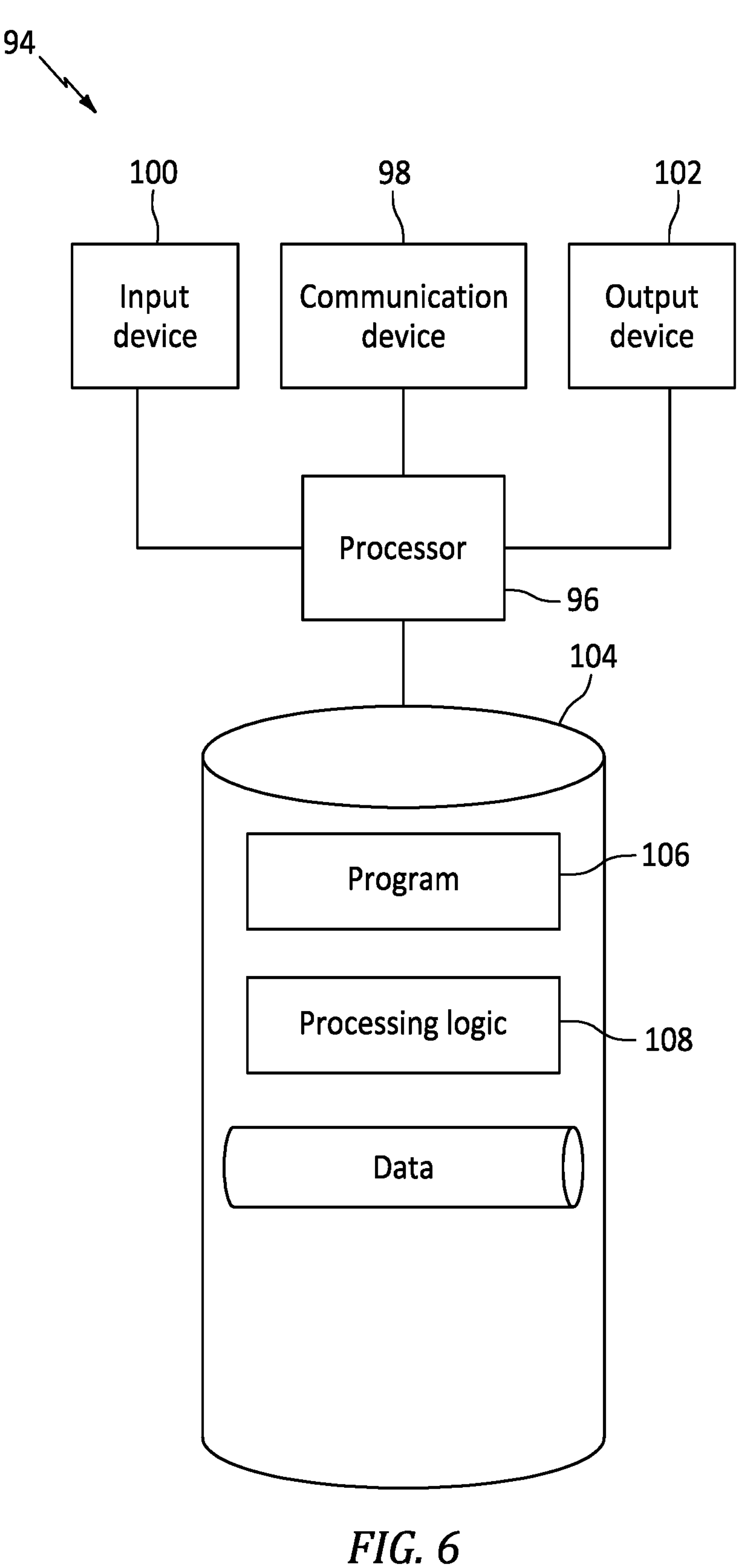
FIG. 6 is a schematic representation of an exemplary mission platform.
Figure 8:
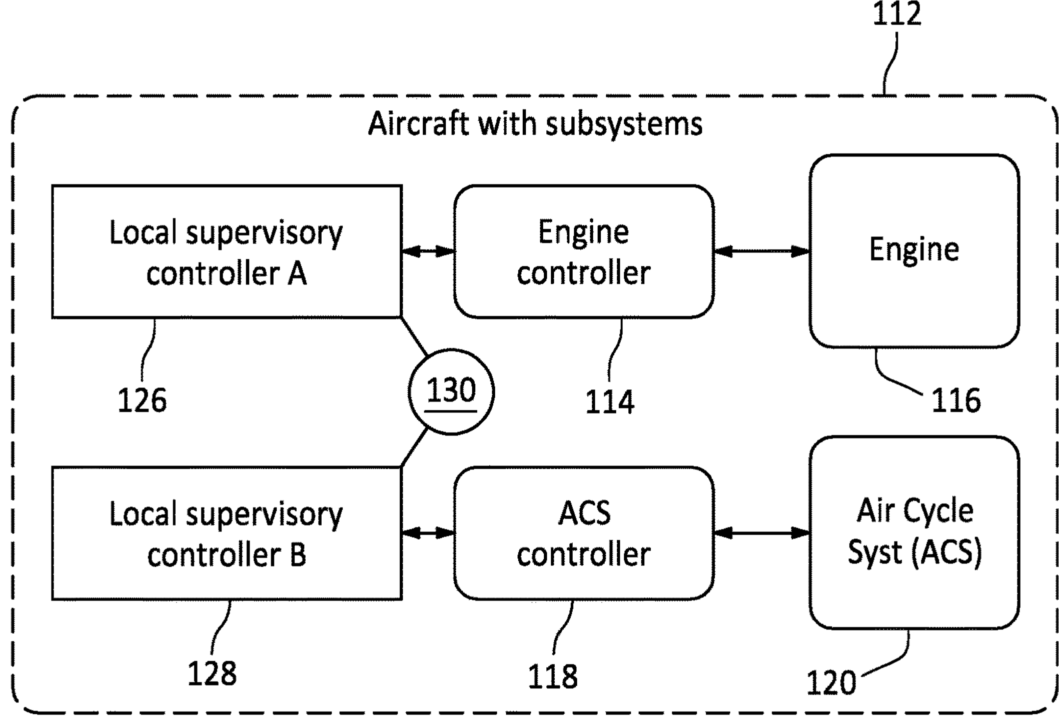
FIG. 8 is a schematic representation of an exemplary supervisory control integrated with an aircraft.

Referring also to FIG. 6, the embodiments described herein may be implemented using any number of different hardware configurations. For example, FIG. 8 illustrates a mission platform 94 that may be, for example, associated with the system 16 of FIG. 2. The mission platform 94 comprises a mission processor 96 ("processor"), such as one or more commercially available Central Processing Units (CPUs) in the form of one-chip microprocessors, coupled to a communication device 98 configured to communicate via a communication network (not shown in FIG. 6). The communication device 98 may be used to communicate, for example, with one or more users. The mission platform 94 further includes an input device 100 (e.g., a mouse and/or keyboard, buttons, touch-screen to enter information) and an output device 102 (e.g., to output and display the executing mission and/or the mission options).

The processor 96 also communicates with a memory/storage device 104. The storage device 104 may comprise any appropriate information storage device, including combinations of magnetic storage devices (e.g., a hard disk drive), optical storage devices, mobile telephones, and/or semiconductor memory devices. The storage device 104 may store a program 106 and/or mission processing logic 108 for controlling the processor 96. The processor 96 performs instructions of the programs 106, 108, and thereby operates in accordance with any of the embodiments described herein. For example, the processor 96 may receive data and then may apply the instructions of the programs 106, 108 to determine at least one mission plan 72.

The programs 106, 108 may be stored in a compressed, uncompiled and/or encrypted format. The programs 106, 108 may furthermore include other program elements, such as an operating system, a database management system, and/or device drivers used by the processor 96 to interface with peripheral devices. As used herein, information may be "received" by or "transmitted" to, for example: (i) the platform 94 from another device; or (ii) a software application or module within the platform 94 from another software application, module, or any other source.

Figure 7:
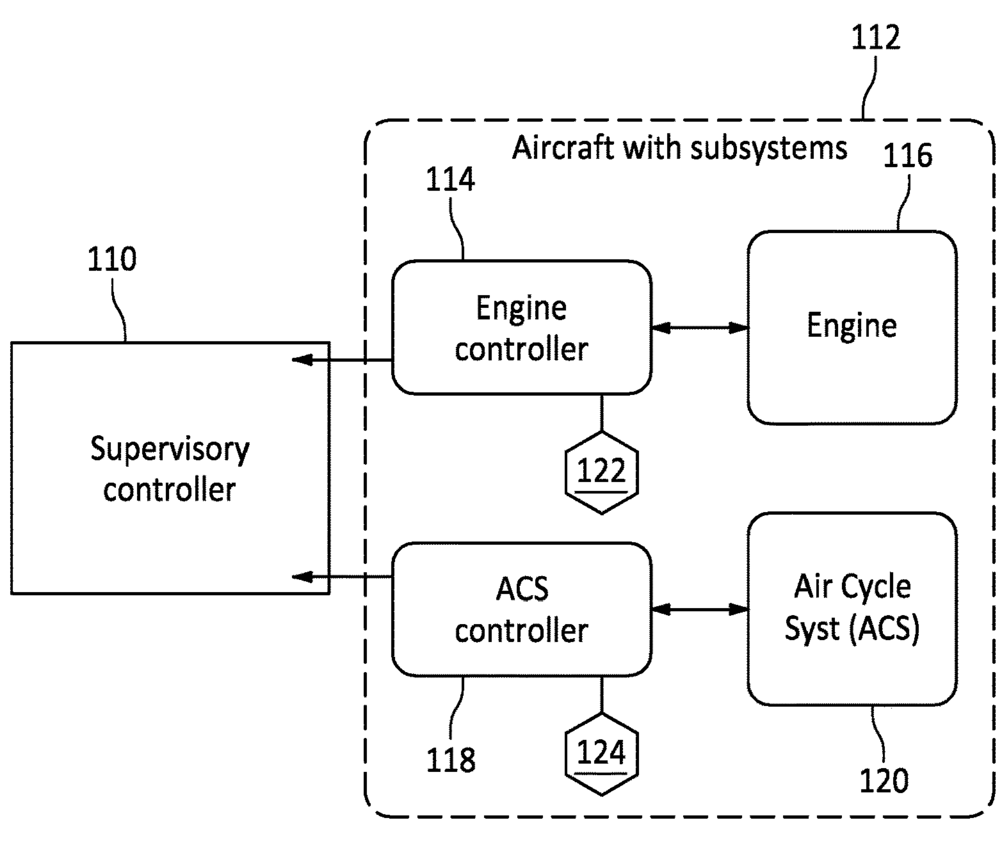
FIG. 7 is a schematic representation of an exemplary supervisory control integrated with an aircraft.

Referring also to FIG. 7 an exemplary arrangement is shown for optimizing fuel flow during a mission for minimum consumption. A supervisory controller 110 is shown in operative communication with aircraft subsystems 112. For example, the supervisory controller 110 can be in operative communication with an engine controller 114 and engine 116. The supervisory controller 110 can be in operative communication with the Air Cycle system (ACS) controller 118 and the Air Cycle system 120. In this exemplary embodiment, the engine control 114 needs to optimize fuel use, so the supervisory controller 110 is employed in real-time, to provide setpoints for the engine controller 114 and the ACS controller 118 that can regulate the generator use or the air cycle system for on board temperature or electronics temperature, so that fuel use is minimized while allowing some components to heat within predetermined constraints. Constraints for the IPPTMS and its subsystems include but are not limited to: limits on temperatures of components, compartments, and the gas inside the subsystems; limits on excursions of engine spool rotation speed from desired reference values; limits on supply flows. Operation outside of these limits can either result in damage to the subsystems leading to premature mission termination, or otherwise failure to fulfill mission objectives. Some of the variables of the IPPTMS described herein have both setpoints, known as goals or target values, as well as constraints. One example is the temperature inside the cockpit or of a system component. This temperature may have a desirable value that the control system tries to achieve, but there is no damage to the system or components, or failure to meet mission objectives if the temperature is not at the desirable value (known as the goal), as long as it remains within the constraints.

More specifically, the supervisory controller 110 can generate signals delivered by physical implementation protocols to lower-level controllers, which in this case command fuel valves and compressor vanes, as well as air cycle machine valves.

The engine controller 114 can be configured to send commands to actuators to control at least one of the fuel flow, vane, and bleed of the engine 116. The engine controller 114 can be configured to receive setpoints for engine parameters such as speed and temperature from the supervisory controller 110. The engine controller 114 can include an engine state estimator 122.

The engine state estimator 122 computes the values of engine states that are needed for control, but which are not measured. This computation is done using the measured quantities in the engine (such as pressures, temperatures, and spool speeds), together with a model of the engine, and can employ a multitude of algorithms, for example, a Kalman filter. The engine controller 114 can be configured to utilize setpoints in a local control loop as backup when the supervisory controller 110 fails.

The ACS controller 118 can be configured to send valve commands to thermal control loops. The ACS controller 118 can be configured to receive setpoints for working fluid temperatures and flows from the supervisory control 110. The ACS controller 118 can include a state estimator 124, which can employ similar or different algorithms to the engine state estimator described above. The ACS controller 118 can be configured to employ setpoints in a local control loop as backup in the event that setpoints from the supervisory controller 110 are invalid, delayed, or otherwise unavailable.

The supervisory controller 110 can utilize a dedicated computer that efficiently solves constrained optimization problems. Solving a constrained optimization problem involves finding the minimum of a cost function constructed using system variables (an example of a cost function is the deviation of measured engine rotational speed from its reference or target setpoint), while ensuring the constraints described above (such as temperature limits) are enforced. For example, a value of working fluid temperature in the ACS resulting in minimum deviation of the engine speed from its reference may be outside the allowable temperature limits. A constrained optimization problem will return a value for which the deviation in engine speed may be larger, but the working fluid temperature is within limits.

The supervisory controller 110 is implemented on a computer that can solve the optimization problem in time to ensure that the references to the subsystem control loops will result in enforcement of the system constraints, while also meeting mission objectives. After each solution, the parameters of the optimization problem are updated and the problem is solved again. This process produces new references for the subsystem controllers, so that the constraints are still enforced while mission objectives, which may have changed since the last update of the references, are again met. Such a computer is referred to herein as a real-time computer.

In the embodiment shown in FIG. 7, the supervisory controller 110 can enforce constraints, such as in minimizing fuel use while keeping temperatures within limits, which is enforcement of temperature constraints. In this example, the cost function of the optimization problem may be formulated in such a way so that the goal of meeting the temperatures of the cockpit or certain components is lower priority than meeting the goal of minimizing fuel use, as long as the temperatures are within constraints. In practice, this may mean drawing less bleed air from the engine to the ACS so that the engine operates more efficiently until more air is needed by the ACS to enforce temperature limits.

The supervisory control 110 includes a linear dynamic model of the IPPTMS which is necessary for the constraint-enforcing Model Predictive Control (MPC) that is used in the supervisory controller 110. MPC involves solving a constrained optimization problem, where the solution is a sequence of control inputs that minimizes a cost function while satisfying constraints for a system over a time horizon. The time horizon is defined as a subset of the mission in the context of the system described here. For example, a MPC solution may include a sequence of valve position commands over a period of time.

A linearization is an approximate model of the system that allows prediction of the system response to a sequence of control inputs over a finite number of time-steps, described above as time horizon. This model allows an MPC to solve the constrained optimization problem described above.

In practice, only the first control input from the sequence computed by the MPC is applied to the actual system, and the constrained optimization over the time horizon is then repeated, in order to take into account the changes in the state of the system.

Real-time linearization is the computation of a linearization of the system in time to allow a controller, for example an MPC, to enforce system constraints, while meeting mission objectives.

This computation can be achieved via a calculation based on a nonlinear model of the system that is stored in onboard memory 104.

An alternative to real-time linearization, that can also be used for supervisory control 110 using MPC, is the use of a Linear Parameter Varying (LPV) model, which is a linearization that is looked up based on measured system parameters from a database that is stored in the memory 104.

The linearization of the IPPTMS, which consists of at least one engine and at least one component of a PTMS (such as ACS, generator, fuel thermal management system), can be generated using a composition of linear models of each subsystem. Composition is an approach for constructing a mathematical model of a system formed from the interconnection of two or more subsystem models. Examples of such interconnections can include a physical connection between subsystems (for example flow from engine bleed to ACS intake) or the connection between a subsystem and its associated controller.

The supervisory controller 110 can enforce constraints, such as in this embodiment on fuel use. The supervisory controller 110 can be configured to receive measurements from subsystem controllers 114, 118. The supervisory controller 110 Can include estimation of some states based on those measurements. The supervisory controller 110 can be configured to compute in real-time setpoints for the subsystem controllers 114, 118.

Referring also to FIG. 8, an exemplary aircraft with subsystems is illustrated. In the embodiment shown in FIG. 8, the objective of the system is again minimization of fuel use as in FIG. 7, but there are two local supervisory controllers 126, 128, one for the engine 114, and another one for the ACS 118, both implemented on real-time computers to provide setpoints for the engine controller 114 and ACM controller 118 that regulate generator use or the air cycle system 120 for on board temperature or electronics temperature, so that fuel use is minimized while some heating of components may be allowed within constraints.

The two local supervisory controllers 126, 128 provide setpoints for the engine controller 114 that regulates the engine operation (through setting fuel flow to match a speed reference) and ACS controller 118 that regulates the use of the air cycle system 120 for on-board temperature or electronics temperature control, so that fuel use is minimized while some heating of components may be allowed within constraints. More specifically as seen in FIG. 8, the configuration includes local supervisory controller A 126 and a local supervisory controller B 128 configured to control/generate signals delivered by physical implementation protocols to lower-level controllers, in this case, engine fuel valves and compressor vanes, as well as air cycle machine valves. The local supervisory controllers 126, 128 can receive mission-level objectives, setpoints, and constraints to maximize fuel. A local supervisory controller 126, 128 is either physically collocated with its associated subsystem or computes an optimal reference for its associated subsystem only, even though it may not be physically collocated with the subsystem. The benefit of this architecture is that local supervisory controllers 126, 128 solve problems with a smaller number of variables, which reduces the solution time in comparison with solving the complete problem in one supervisory controller 110. This architecture is also known as a distributed architecture. The problems solved by the local supervisory controllers 126, 128 will be referred to as sub-problems, and the solutions of such sub-problems will be referred to as partial solutions.

This kind of distributed architecture is also beneficial for applications like distributed propulsion. The local supervisory controllers 126, 128 can be configured with their own calculation of the cost function to minimize by solving optimization problems with fewer variables compared to optimizing the entire system. The local supervisory controllers 126, 128 can communicate their solutions via a network 130. The local supervisory controllers 126, 128 can synchronize their communication via the network 130, and each local supervisory controller will choose the reference to send to its associated subsystem controller that minimizes cost function for all local controllers. The local supervisory controllers 126, 128 can be configured to send setpoints for local controllers 114, 118.

In another exemplary embodiment, there can be a multitude of local supervisory controllers, 126, 128.

Figure 9:
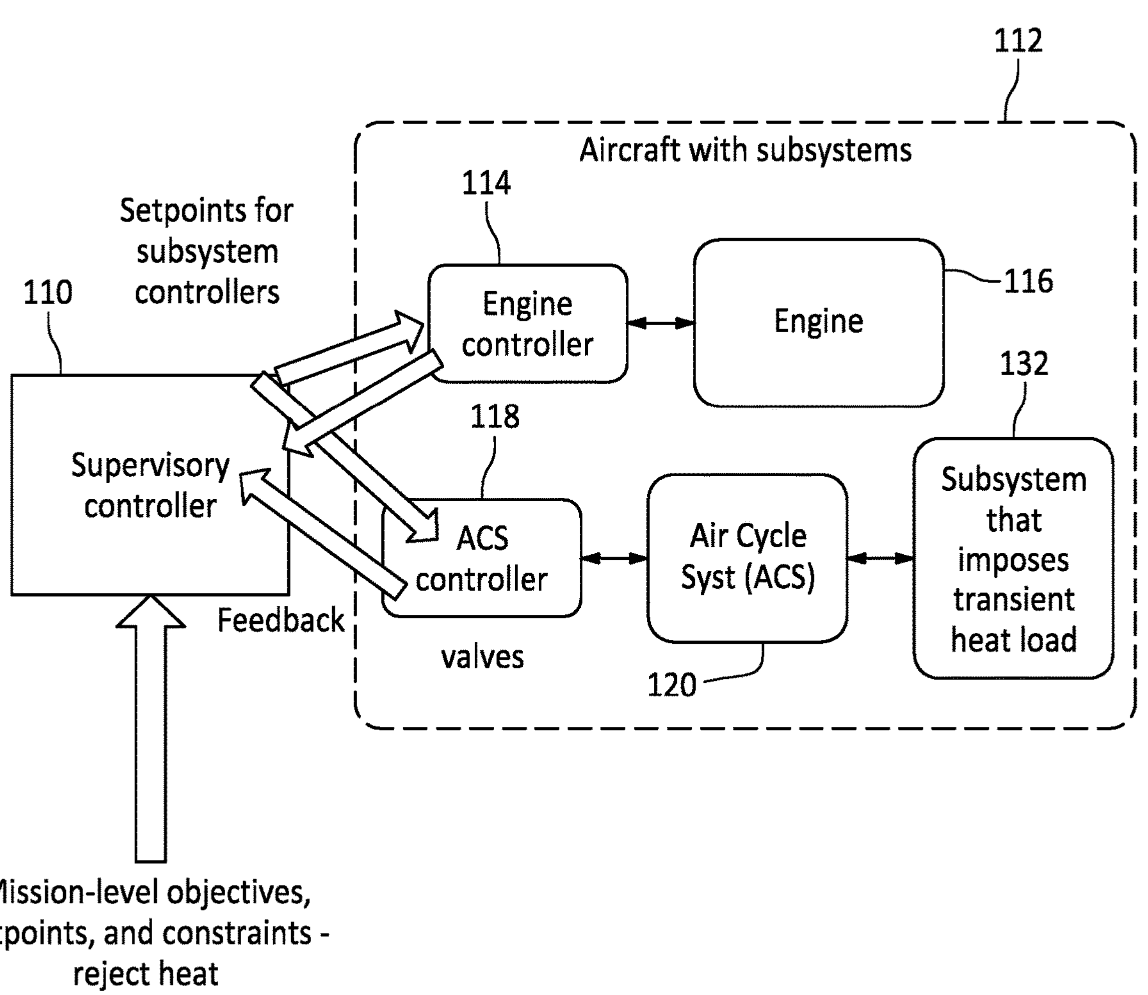
FIG. 9 is a schematic representation of an exemplary supervisory control integrated with an aircraft.

Referring also to FIG. 9, an alternative example to mitigate sudden power and heat transient loads to maintain ambient temperature is illustrated. In this embodiment, an air cycle system device or similar device that controls temperature on board an aircraft may also need to reject heat from a transient load in a subsystem 132. The supervisory controller 110 can generate commands for valves and other actuators in the air cycle system 120 so that appropriate amount of air is drawn from the engine 116. The supervisory controller 110 also sends corresponding signals to the engine controller 114 to maintain engine 116 performance, and thus coordinates the two objectives.

Figure 10:
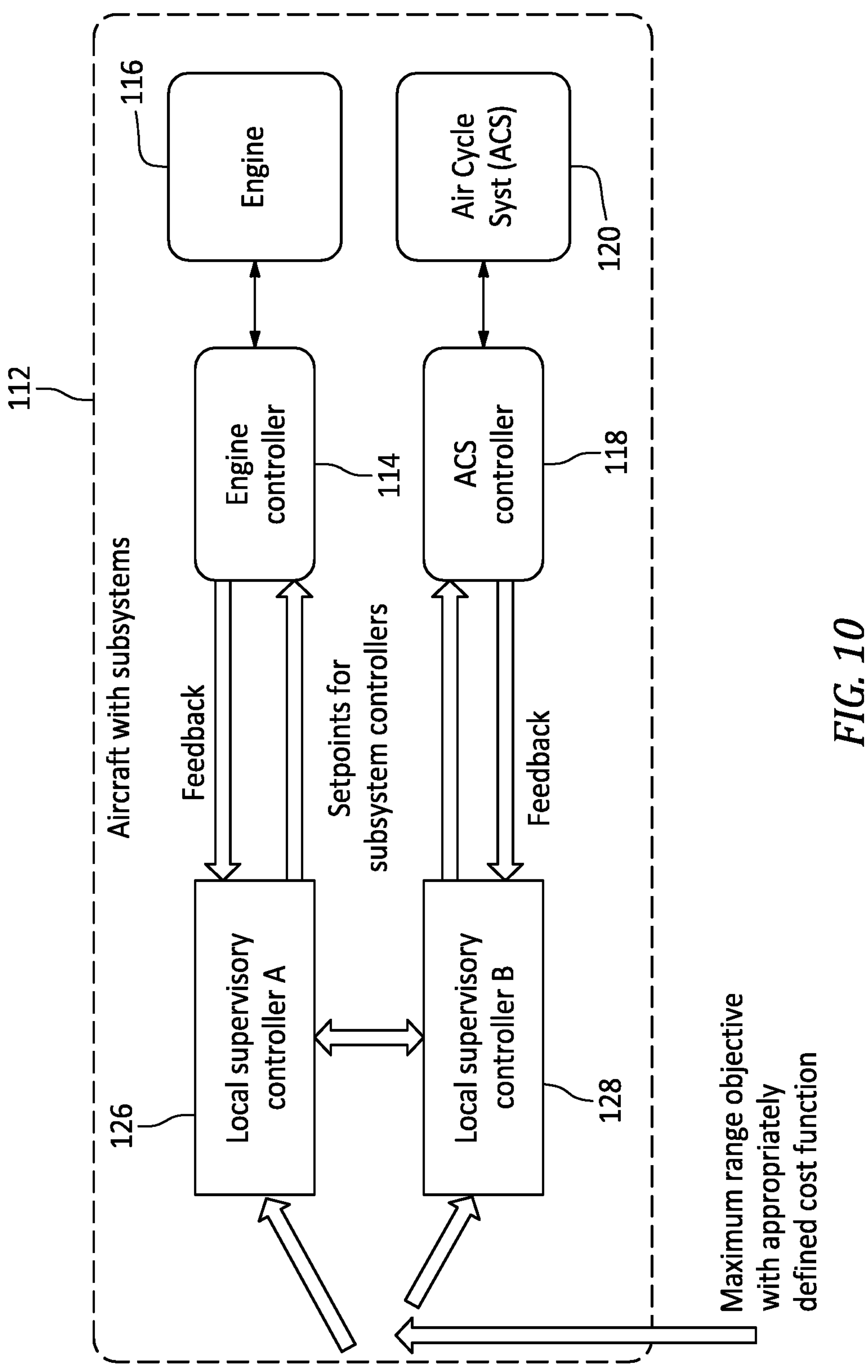
FIG. 10 is a schematic representation of an exemplary supervisory control integrated with an aircraft.

Referring also to FIG. 10, an alternative example to mitigate sudden power and heat transient loads to maintain ambient temperature, is shown. In the embodiment shown in FIG. 10, an air cycle system 120 or similar device that controls temperature on board an aircraft 10 that needs to reject heat from a transient load. The local supervisory controller 126, 128 generates commands for valves and other actuators in the air cycle system 120 so that an appropriate amount of air is drawn from the engine 116. The local supervisory controller 126, 128 also sends corresponding signals to the engine controller 114 system to maintain engine performance, and thus coordinates the two objectives. The system 16 can include a distributed architecture for the supervisory controller 110, the distributed architecture can include a set of local supervisory controllers 126, 128 that solve sub-problems associated with individual subsystems, and each of the local supervisory controllers 126, 128 being in operative communication to simultaneously achieve the mission objective.

Figure 11:
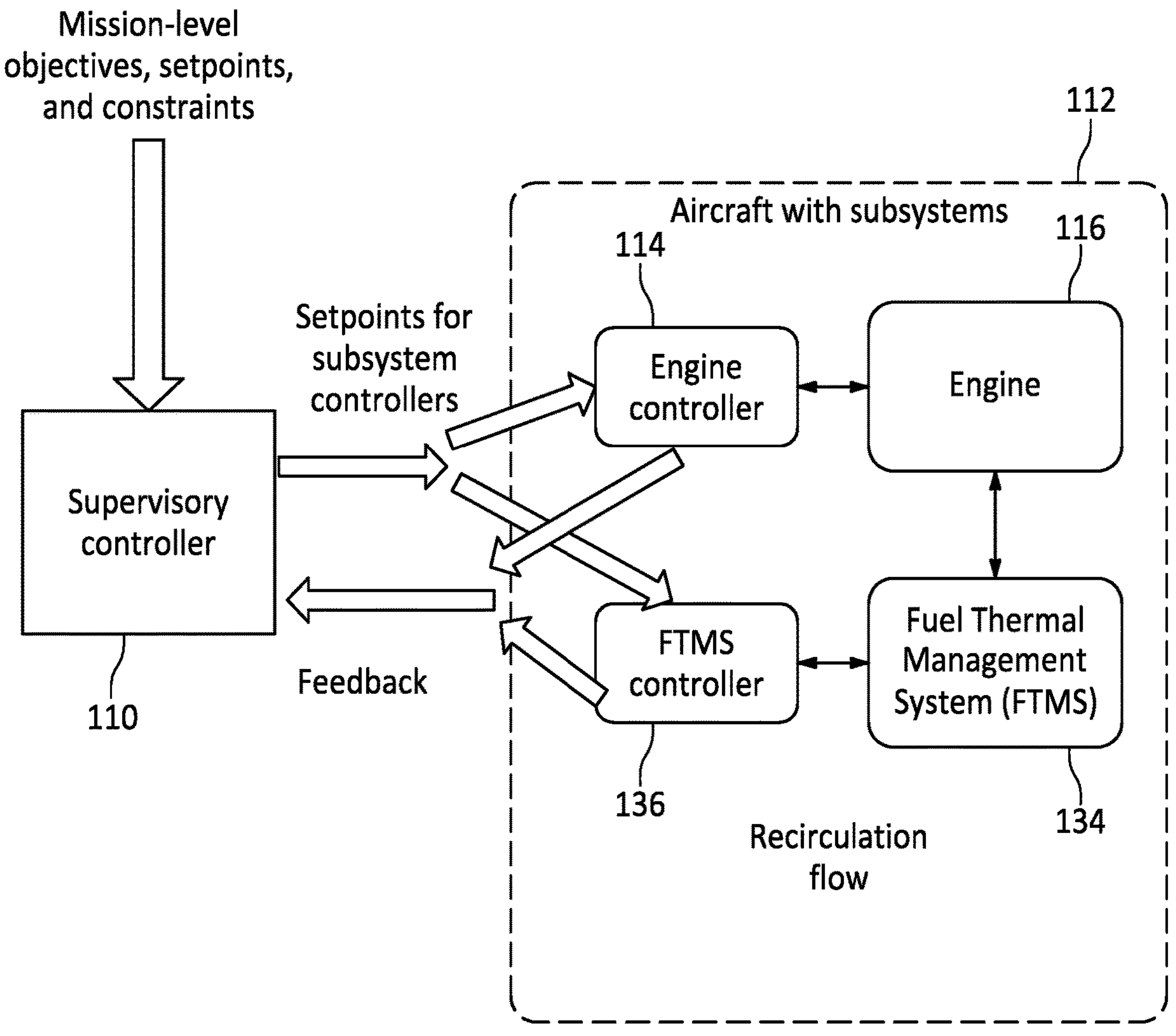
FIG. 11 is a schematic representation of an exemplary supervisory control integrated with an aircraft.

Referring also to FIG. 11, an exemplary embodiment to maintain fuel temperature is shown. Due to engine transients, fuel temperature may become unexpectedly high, and the supervisory controller 110 prevents this by designing actuation profiles for actuators such as, but not limited to, recirculation valves that distribute heat in the fuel system. The actuation profiles are realized by sending signals to the fuel thermal management system 134 via the fuel thermal management system controller 136.

A technical advantage of the disclosed system includes the capacity to respond to disturbances, loads, and changing conditions in real-time by keeping parameters within limits.

Another technical advantage of the disclosed system includes the smaller local problems allow for faster computation, which can enable real-time capability.

Another technical advantage of the disclosed system includes an approach to compose the complete model quickly from smaller multiple subsystem models, where only some of the subsystem models may have changed, and where some or all of the models are updated in real-time.

Another technical advantage of the disclosed system includes a linear model of the IPPTMS necessary for the constraint-enforcing Model Predictive Control that is used for the supervisory controller.

Another technical advantage of the disclosed system includes a supervisory controller that can receive measurements from multiple subsystems of an integrated propulsion, power, and thermal management system for aircraft, compute coordinated control commands for the subsystems based on the measurements in real-time while enforcing constraints and send the computed commands to the subsystems so that system-level objectives are met and constraints are enforced throughout the system operation.

Another technical advantage of the disclosed system includes a real-time Model Predictive Control (MPC) algorithm that sends commands to actuators across the subsystems, which include valves, fuel injectors, vanes, and similar devices.

Another technical advantage of the disclosed system includes some measurements from the multiple subsystems are replaced with estimates computed by an estimation algorithm.

Another technical advantage of the disclosed system includes a distributed architecture for the supervisory control, comprising a set of local solvers for each subsystem that solve sub-problems with communication among them to simultaneously achieve the mission level goals.

Another technical advantage of the disclosed system includes real-time linearization of nonlinear models being computed using system composition of linear models of subsystems that can either be generated in real-time or looked up in a database.

Another technical advantage of the disclosed system includes a supervisory control computer with real-time processing capability to process inputs from subsystems, compute the desired outputs with an optimization solver, and send control inputs to the subsystems based on defined mission goals and constraints.

Another technical advantage of the disclosed system includes the capability to fulfill more complex missions with higher demands and loads, more specifically by setting goals and enforcing constraints.

Another technical advantage of the disclosed system includes a supervisory control that can explore the limits of the system, providing guidelines for re-design and/or improved tuning of subsystem controllers.

Another technical advantage of the disclosed system includes additional computers attached locally to subsystems that compute smaller sub-problems and communicate partial solutions in a synchronized fashion among themselves and the main supervisory control computer and send commands to the subsystems.

Another technical advantage of the disclosed system includes there is no one central computer, but the entire supervisory controller is distributed and communication is implemented via a physical network.

There has been provided a control system. While the control system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A system comprising:

a supervisory controller configured to:

receive one or more system objectives and constraints for mission segments of a complete aircraft mission received from an operator or a mission management computer;

receive data output from at least one subsystem, the data output including a measurement of an aircraft physical system state;

generate reference commands to coordinate local subsystem controllers to address one or more system objectives and constraints;

send computed reference commands to local subsystem controllers;

a memory for storing program instructions;

a processor for solving constrained optimization problems in response to changing data outputs from subsystems or changing system objectives and constraints;

at least one local supervisory controller, operatively coupled to the memory, and in communication with the supervisory controller and operative to execute program instructions to:

receive reference commands from a supervisory controller; and execute reference commands received from the supervisory controller to operate the at least one subsystem.

2. The system according to claim 1, wherein the at least one subsystem comprises an element of an integrated propulsion, power, and thermal management system for the aircraft.

3. The system according to claim 2, further comprising instructions for the local supervisory controller to:

generate coordinated control commands for at least one subsystem controller based on the data outputs from subsystems while enforcing constraints by solving constrained optimization problems on a real-time computer, and send the generated commands to the subsystem controllers so that system objectives can be met and constraints are enforced throughout the system operation.

4. The system according to claim 3, wherein said commands are sent from a Model Predictive Control algorithm executed on a real-time computer.

5. The system according to claim 2, further comprising instructions for the subsystem controllers to:

send commands to actuators within the subsystems, the actuators selected from the group consisting of valve actuators, fuel injector actuators, vane actuators.

6. The system according to claim 1, wherein at least one measurement from the at least one subsystem is replaced with estimates computed by an estimation algorithm on a real-time computer.

7. The system according to claim 1, further comprising:

a distributed architecture for the supervisory controller, the distributed architecture comprising a set of local supervisory controllers that solve sub-problems for at least one subsystem, each of the local supervisory controllers being in operative communication to simultaneously achieve the mission or system objective while enforcing system constraints.

8. The system according to claim 1, further comprising:

generation of a linear model of the system using a composition of subsystem linear models that can either be computed in real-time or looked up in a database based on measured or estimated subsystem states.

9. A process for an aircraft comprising:

providing a supervisory controller receiving one or more system objectives and constraints for mission segments of a complete aircraft mission received from an operator or a mission statement computer;

receiving data output from at least one subsystem, the data output including a measurement of an aircraft physical system state;

generating reference commands to coordinate local subsystem controllers to address one or more system objectives and constraints;

sending computed reference commands to local subsystem controllers;

providing a memory for storing program instructions;

providing a processor for solving constrained optimization problems in response to changing data outputs from subsystems or changing system objectives and constraints;

providing at least one local supervisory controller, operatively coupled to the memory, and in communication with the supervisory controller;

receiving reference commands from a supervisory controller; and executing the reference commands received from the supervisory controller to operate the at least one subsystem.

10. The process of claim 9, wherein the at least one subsystem comprises an element of an integrated propulsion, power, and thermal management system for the aircraft.

11. The process of claim 9, further comprising:

generating coordinated control commands for the at least one subsystem controller based on the data outputs from subsystems while enforcing constraints by solving constrained optimization problems on a real-time computer; and sending the generated commands to the subsystem controllers so that system objectives are obtained and constraints are enforced throughout the system operation.

12. The process of claim 9, further comprising:

sending commands to actuators within the subsystems, the actuators selected from the group consisting of valve actuators, fuel injector actuators, vane actuators.

13. The process of claim 12, wherein said commands are sent from a Model Predictive Control algorithm executed on a real-time computer.

14. The process of claim 9, wherein at least one measurement from the at least one subsystem is replaced with estimates computed by an estimation algorithm on a real-time computer.

15. The process of claim 9, further comprising:

implementing a distributed architecture for the supervisory controller, the distributed architecture comprising a set of local supervisory controllers that solve sub-problems for the at least one subsystem, each of the local supervisory controllers being in operative communication to simultaneously achieve the mission or system objective while enforcing system constraints.

16. The process of claim 9, further comprising:

generating a linear model of the system using a composition of subsystem linear models that can either be computed in real-time or looked up in a database based on measured or estimated subsystem states.

17. The process of claim 9, further comprising:

providing a safe control input to the subsystem in case of a failure of the supervisory controller or an error in the transmission of reference command from the supervisory controller to the subsystem controller.

* * * * *